Figure 1:
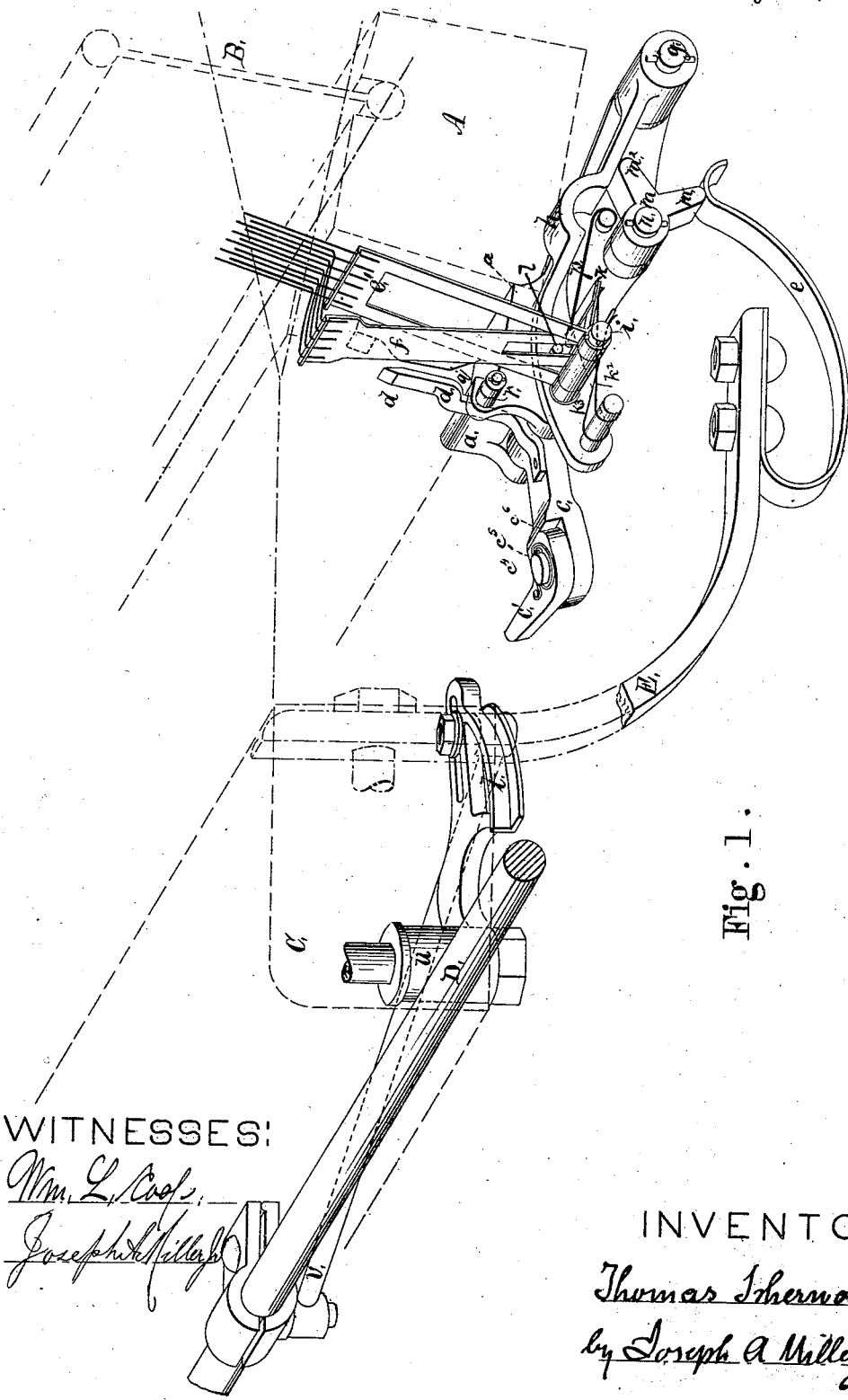

(No Model.) 3 Sheets—Sheet 1.

T. ISHERWOOD.
WEFT STOP MECHANISM FOR LOOMS.

No. 261,232. Patented July 18, 1882.

WITNESSES:

INVENTOR:
Thomas Isherwood
by Joseph A. Miller
atty (No Model.)   T. ISHERWOOD.   3 Sheets—Sheet 2.
WEFT STOP MECHANISM FOR LOOMS.
No. 261,232.   Patented July 18, 1882.
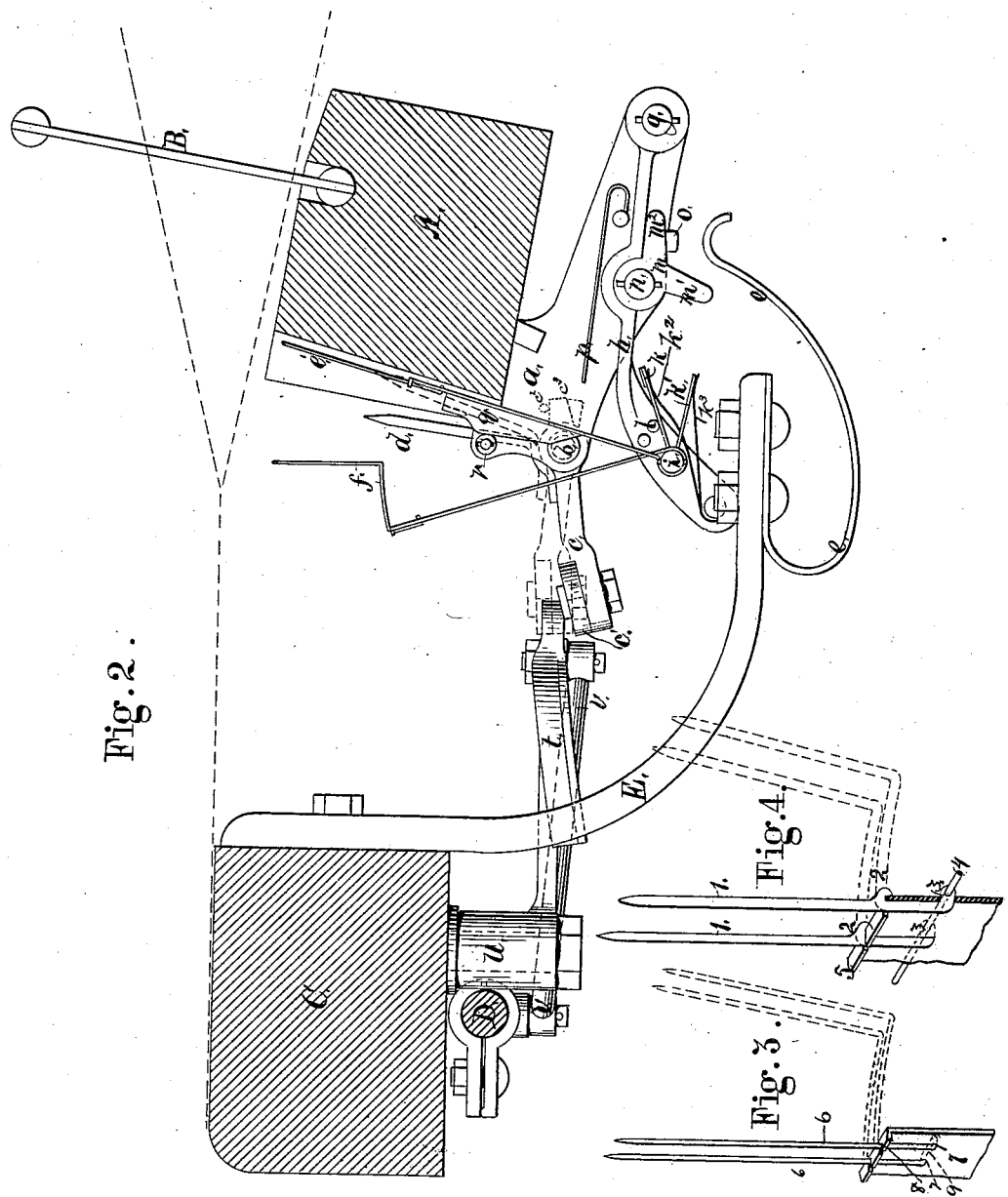
WITNESSES:   INVENTOR:
Thomas Isherwood
by Joseph A. Miller
Atty.

(No Model.) 3 Sheets—Sheet 3.
T. ISHERWOOD.
WEFT STOP MECHANISM FOR LOOMS.
No. 261,232. Patented July 18, 1882.
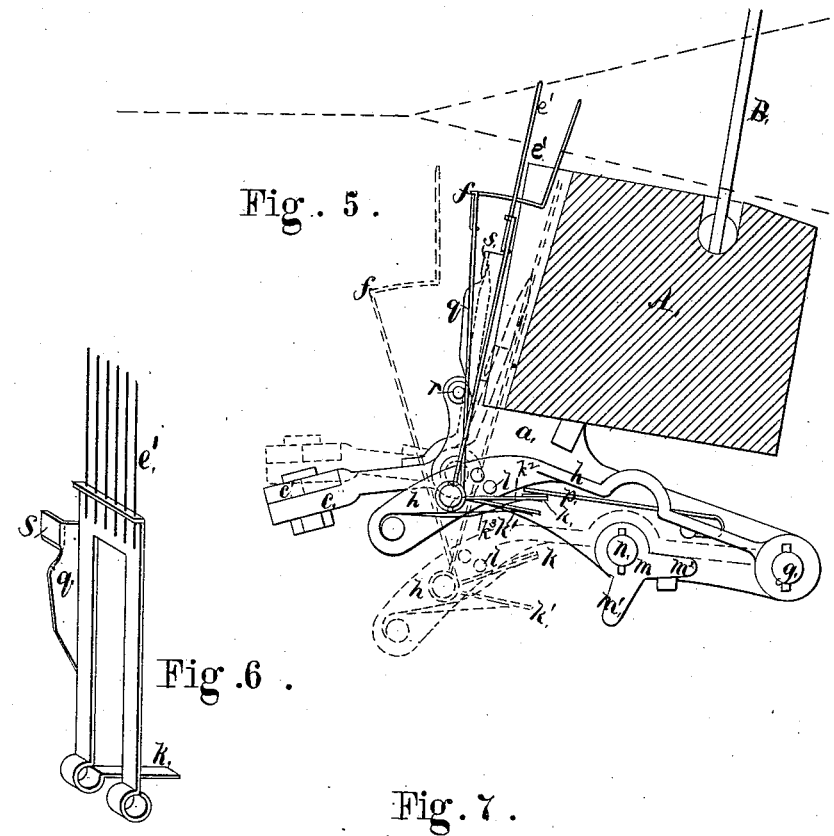
Fig. 5.
Fig. 6.
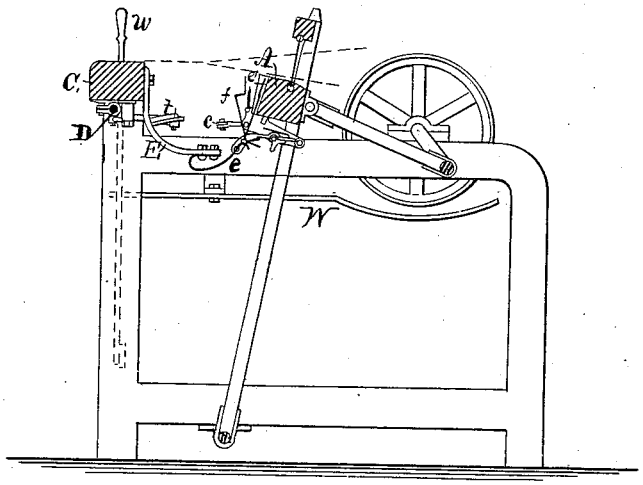
Fig. 7.
WITNESSES: INVENTOR:
Thomas Isherwood
by Joseph A. Miller
atty

UNITED STATES PATENT OFFICE.

THOMAS ISHERWOOD, OF WESTERLY, RHODE ISLAND.

WEFT-STOP MECHANISM FOR LOOMS.

SPECIFICATION forming part of Letters Patent No. 261,232, dated July 18, 1882.

Application filed September 23, 1880. (No model.)

*To all whom it may concern:*

Be it known that I, THOMAS ISHERWOOD, of Westerly, in the county of Washington and State of Rhode Island, have invented a new and useful Improvement in Weft-Stop Mechanism for Looms; and I hereby declare that the following is a full, clear, and exact description of the same, reference being had to the accompanying drawings, forming part of this specification.

This invention relates to a weft-stop mechanism connected with the lay and breast beams and operated by the movement of the former, the object of the invention being to increase the promptness and precision of action of this class of stop mechanisms.

In its general construction the mechanism may be described as having two weft-forks, which at the proper time pass upward into the shed of the warp, their tines passing between the warp-threads and feeling for the weft-thread, which, if present, prevents the tines of one fork from passing between those of the other, so that after performing the feeling movement the forks may descend and pass under the web without operating the devices for stopping the loom; but if the weft-thread is not present, the shuttle having failed to lay a weft-thread at the proper time in the shed of the warp, the tines of one fork pass through or between the tines of the other fork, and an arm controlled by the weft-forks comes in contact with a cam connected with a stop-rod, moving said stop-rod to cause the release of a shipper-lever, which in turn operates a belt-shipper to stop the loom.

The invention consists in certain novel constructions and combinations of devices, which will be hereinafter particularly described with reference to the accompanying drawings, in which—

Figure 1 is a perspective view, showing the forks raised, with their tines projecting into the shed of the warp, the lay-beam, breast-beam, and reed being shown in broken lines. Fig. 2 is a side view, partly in section, showing the forks depressed. Fig. 3 is a perspective view, illustrating one method of connecting the tines of the weft-forks with the plates. Fig. 4 is a perspective view, illustrating a modified connection of the forks with the plates. Fig. 5 is a side view of the devices connected with the lay-beam, showing the position of the weft-forks immediately after they have performed the feeling movement when no weft-thread has been laid by the shuttle, and showing, also, in broken lines the position of the forks when they have descended from the position shown in full lines and caused a movement of the stop-lever. Fig. 6 is a perspective view of the rear fork detached, showing the cam and projection by which the dagger on the stop-lever is drawn back so as to raise the said lever. Fig. 7 is a sectional view of a loom, showing the stop mechanism as in use in connection therewith.

The letter A designates the lay-beam. B is the reed; C, the breast-beam; D, the stop-rod; and E is a bracket secured to the breast-beam and provided with the curved spring $e$, the inner bent end of which causes the elevation of the weft-forks as the lay moves forward toward the breast-beam, and yields to the pressure of the weft-fork-operating means as the lay moves backward.

To the lay-beam A is secured a bracket, $a$, and to the front of this bracket, on the pin $b$, the stop-lever $c$ is hinged, so that it can rock on said pin, the stop-lever being limited as to its downward movement by means of a pin, $c^2$, against which strikes a rearward projection, $c^3$, of said lever, so that said lever will not fall below the position indicated in full lines in Fig. 2.

Secured to the stop-lever $c$, and moving with the same, is the pointed dagger $d$, by means of which the stop-lever is raised when the projection on the rear fork, $e'$, descends in front of the dagger, which it does when no weft-thread has been laid by the shuttle, and the tines of the front fork, $f$, pass rearwardly between those of the said rear fork.

To the rear end of the bracket $a$ the lever $h$ is pivoted upon a stud, $g$, and upon the front free end of this lever is a laterally-projecting pin, $i$, upon which are pivoted the front fork, $f$, and rear fork, $e'$, the plate of the former being arranged within the slotted plate of the latter. The front fork is provided at its pivoted end with a rearward projection, $k$, below which is a projection, $k'$, from the pivoted end of the rear fork. Two springs, $k^2$ and $k^3$, act on these projections, respectively, the former tending to force the projection $k$ of the front fork against the stop-pin $l$, and the latter tending to press the rear fork forward into the position shown in Fig. 5.

The letter $m$ designates a sleeve upon a pin, $n$, projecting from the bracket $a$, said pin being provided with arms $m'$ and $m^2$, the latter of which is limited as to its downward movement by means of a stop, $o$, projecting from the bracket. The lever $h$ rests on the sleeve $m$ when in its normal or lower position, and holds the arms $m^2$ and $m'$ in the position shown in Fig. 2. When the lay is moving forward to beat up the weft the arm $m$ comes in contact with the curved end of the spring $e$, as shown in Fig. 1, and the said arm being thus pressed rearwardly turns the sleeve $m$ on the stud $n$, and the arm $m^2$ swings upward and raises the lever $h$, and with it the forks $f$ and $e'$. As soon as the arm $m'$ has passed the curved end of the spring $e$ and is released from said spring the arm $m^2$ yields and the lever $h$ descends by gravity; or it may be made to descend more promptly by a spring arranged to press it downward. When, now, the lay moves back away from the web the arm $m'$ comes again in contact with the curved end of the spring $e$; but as the arm $m^2$ then rests on the stop $o$ the sleeve $m$ cannot turn in response to the pressure on the arm $m'$, and therefore the spring $e$ yields and allows the arm $m'$ to pass over it.

The operation of the forks $f$ and $e'$ during the rising and falling of the lever $h$ is as follows: As the lever $h$ rises the projection $k$ of the front fork comes in contact with a spring, $p$, which has one end fixed to the bracket $a$, and this spring being stiffer than the spring $k^2$, which presses on the under side of the projection $k$, said spring $k^2$ and the projection $k$ will yield as the lever rises, and the front fork, $f$, will move rearwardly while the lay is moving forward, the tines of said warp combing the warp-threads backwardly and feeling for the weft-thread. The rear fork, $e'$, is provided with a cam, $q$, as shown in Figs. 1, 2, 5, and 6, and the projection $s$ extending laterally from the upper end of said cam. This cam increases in width upwardly, and when the fork is depressed the edge of the wide upper portion of the cam rests against and behind a roller, $r$, pivoted on a pin projecting from a forwardly-projecting portion of the bracket. Now, as the lever $h$ rises the cam $q$ rides upward on the roller $r$ and the tines of the fork $e'$ pass between the warp-threads. As the width of the cam $q$ decreases the spring $k^3$, pressing against the projection $k'$, causes the fork $e'$ to move slightly forward, so that the projection $s$ moves to a position forward of the dagger $d$. If, now, a weft-thread has been properly laid by the shuttle, the rearwardly-moving tines of the front fork, $f$, will push the thread against the tines of the rear fork, $e'$, and both forks will then move back toward the reed and descend with the lever $h$, the rear fork carrying the projection $s$ down behind the dagger to the position shown in Fig. 2. The forks, after their rearward movement and just before descending, stand in the position shown in Fig. 1, and make their descent with the lever $h$ when the arm $m'$ has moved a little farther forward than is shown in said figure and escaped the spring $e$. As the lever $h$ descends the pressure of the spring $p$ upon the projection $k$ ceases and the spring $k^2$ forces said projection upward again against the stop-pin $l$, thus causing the front fork, $f$, to be thrown forward to its normal position, as shown in full lines in Fig. 2 and in broken lines in Fig. 5. While the front fork is thus being placed in its normal position the edge of the cam $q$ rides downward on the roller $r$, the increasing width of the cam causing the rear fork, $e'$, to be forced backward to its normal position also.

The operation of the parts having taken place as now described, no stoppage of the loom occurs; but if no weft-thread has been laid the tines of the front fork, not meeting any obstruction as they comb the warp rearwardly, will pass between the tines of the rear fork and not force said fork backward, and when now the forks descend the projection $s$ will be carried down in front of the point of the dagger $d$, and the backward movement imparted to the fork $e'$ by the cam $q$ in riding down on the roller $r$ will cause the projection $s$ to draw the dagger $d$ backward, thus raising the stop-lever $c$ to the position shown in dotted lines in Figs. 2 and 5. This stop-lever $c$ is provided at its end with the inwardly-projecting pivoted pawl $c'$, which is held in its normal position by a spring, $c^5$, so that its shoulder $c^4$ will abut against a shoulder, $c^6$, formed on the lever $c$. When the stop-lever $c$ has been raised, owing to the failure of the shuttle to lay a weft-thread, the pawl $c'$ strikes the cam-arm $t$, which is pivoted at $u$ and connected by means of the rod $v$ to the stop-rod D. As the lay moves forward the pawl $c'$ rides along the curved edge of the cam-arm $t$, forcing said arm laterally inward and the connecting-rod $v$ and stop-rod D in a corresponding direction, causing said stop-rod, by means of a projection, (not shown in the drawings, but which will be readily understood,) to release the hand shipping-lever $w$, (shown in Fig. 7,) so that said lever will operate the belt-shipper W to shift the driving-belt from the tight to the loose pulley and stop the loom.

The cam-arm $t$, connecting-rod $v$, stop-rod D, hand shipping-lever $w$, and belt-shipper W compose the shipping mechanism of the loom, as illustrated in the drawings; but I do not confine myself to the precise construction of this shipping mechanism as shown, it being only essential that a movable part answering to the cam-arm $t$ shall be arranged in such position as to be struck and moved by the stop-lever when the same is raised and communicate motion to a belt-shipper through suitable intermediate devices.

The stop-rod D may be connected with and operate a brake in the usual manner to check the momentum of the loom. The pawl $c'$ will remain in contact with the cam-arm $t$ until the loom is again started by hand, so that the belt will be kept on the loose pulley and cannot run back to the tight or driving pulley until the loom is again so started.

In the form of weft-fork partially shown in Fig. 4 the tines are attached to the plates separately, each being provided with a notched shoulder, 2, which fits upon the upper edge of the plate, and a bent portion, 3, which projects through a slot in the plate below, and is perforated to receive a rod, 4, which may be a common attaching-rod for all the tines. The shouldered portions of the tines set in notches formed in the flange 5 at the top edge of the plate, so that the tines are braced against lateral deflection in any direction. The shoulders and the rod 4 hold the tines very firmly to the plate, and at the same time permit them to be readily removed and replaced.

In the modified manner of connecting the tines to the plate illustrated in Fig. 3 each pair of tines 6 is formed of a single rod of wire bent to form a loop, the arms of which are the tines, and are connected by a straight portion, 9, of the rod. The two tines are passed through the holes 7 in the plate, bringing the straight portion 9 against the face of the plate, and the tines are then bent upward into the notches formed to receive them in a flange, 8, on the upper edge of the plate. This I regard as a very cheap mode of attaching the tines, and it enables the easy removal and replacement of any which may become bent or otherwise ineffective. In Figs. 3 and 4 the tines shown in full lines are those of a rear fork of the mechanism which I have heretofore described, while the tines of the front fork are indicated in broken lines. I have shown these special forms of weft-forks thus in detail because I regard them as the best within my knowledge; but I have elsewhere in my drawings indicated no special construction of the tines or forks other than is necessary to explain their operation.

Having now fully explained my invention and described the operation thereof, I claim—

1. The combination, with the lay, breast-beam, and shipping mechanism, of the stop-lever, two pivoted weft-forks, a lever to support said forks, movable arms to raise said lever, and mechanism whereby said arms are operated to raise the lever and force the forks up into the warp-shed, and means whereby said forks are caused to feel for the weft-thread and raise the stop-lever, when the weft thread is absent, into position to engage with the shipping mechanism, substantially as described.

2. The combination, with the bracket $a$, roller $r$, stop-lever $c$, and dagger $d$, of hinged lever $h$, means for operating said lever, and the weft-forks $f$ and $e'$, the latter provided with a cam, $q$, and extension $s$, the whole adapted to be applied to a loom to operate a shipper mechanism to stop the loom when the shuttle fails to lay a weft-thread, as specified.

3. The combination, with the arm E and its spring $e$, adapted to be secured to the breast-beam of a loom, of a bracket, $a$, applicable to the lay of a loom, the sleeve $m$, provided with arms $m'$ $m^2$, hinged lever $h$, weft-forks $f$ and $e'$ and their springs, and a spring, $p$, adapted to move the fork $f$ backward when raised into the shed and cause said fork to feel for the weft-thread backward while the reed moves forward, substantially as described.

4. The combination, with the spring $e$, its supporting-arm E, stop-rod D, rod $v$, and cam-arm $t$, of a bracket, $a$, roller $r$, hinged lever $h$, sleeve $m$, having arms $m'$ and $m^2$, weft-forks $f$ and $e'$, stop-lever $c$, having pawl $c'$, and the dagger $d$, the whole forming a weft-stop mechanism for a loom, substantially as described.

5. The weft-fork tines 1, provided with the slotted shoulders 2 and ends 3, combined with a plate to receive them, and a pin or wire, 4, to hold them thereupon, substantially as described.

THOMAS ISHERWOOD.

Witnesses:
JOSEPH A. MILLER,
J. A. MILLER, Jr.